Figure 4:
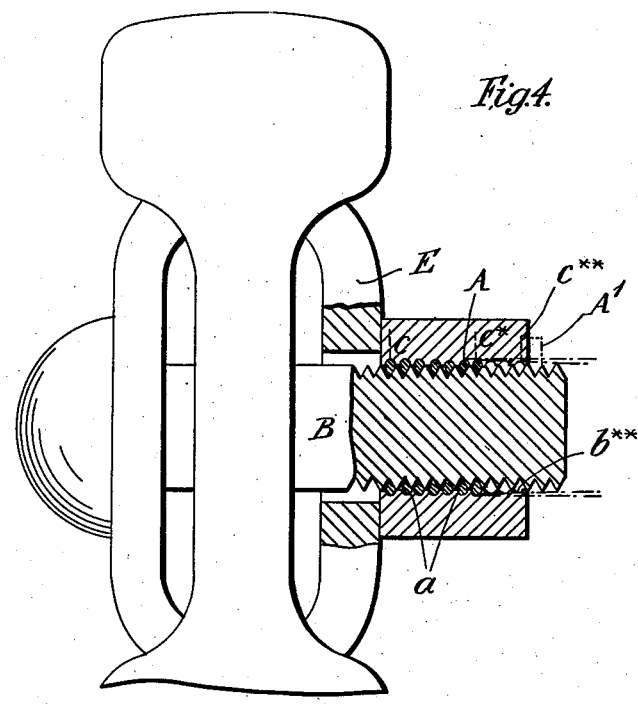

No. 782,349. PATENTED FEB. 14, 1905.
D. MARSHALL.
MEANS FOR LOCKING NUTS, BOLTS, STUDS, &c.
APPLICATION FILED NOV. 27, 1903.
3 SHEETS—SHEET 1.
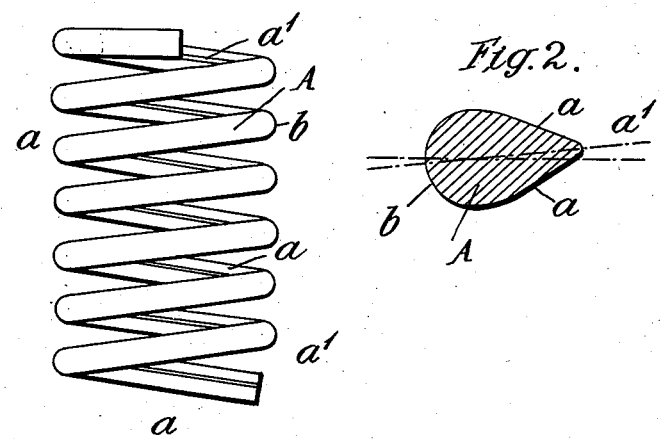
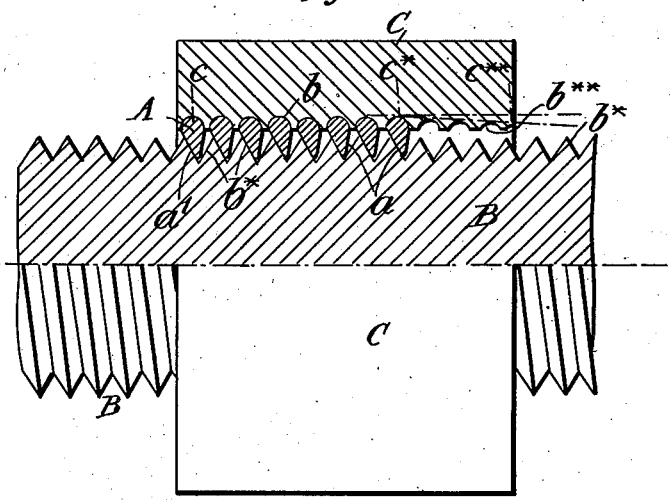

No. 782,349. PATENTED FEB. 14, 1905.
D. MARSHALL.
MEANS FOR LOCKING NUTS, BOLTS, STUDS, &c.
APPLICATION FILED NOV. 27, 1903.

3 SHEETS—SHEET 2.

Witnesses
Percy M. Goodwin.
Robt. Hunter

Inventor Dale Marshall
by His Attorney
Benj. I. King.

No. 782,349. PATENTED FEB. 14, 1905.
D. MARSHALL.
MEANS FOR LOCKING NUTS, BOLTS, STUDS, &c.
APPLICATION FILED NOV. 27, 1903.

3 SHEETS—SHEET 3.

Witnesses
Percy M. Goodwin.
Robt. Hunter

Inventor Dale Marshall
by His Attorney
Benj. J. King.

No. 782,349.                                              Patented February 14, 1905.

UNITED STATES PATENT OFFICE.

DALE MARSHALL, OF CHELTENHAM, ENGLAND, ASSIGNOR OF ONE-THIRD TO JOHN FRANCIS CARR, OF EXETER, ENGLAND.

MEANS FOR LOCKING NUTS, BOLTS, STUDS, &c.

SPECIFICATION forming part of Letters Patent No. 782,349, dated February 14, 1905.

Application filed November 27, 1903. Serial No. 182,817.

*To all whom it may concern:*

Be it known that I, DALE MARSHALL, a subject of the King of Great Britain and Ireland, residing at 30 Winchcombe street, Cheltenham, county of Gloucester, England, have invented certain new and useful Improvements in and Connected with Means for Locking Nuts, Bolts, Studs, and the Like, of which the following is a specification.

My invention relates to improved means for locking nuts, collars or couplings, bolts, studs, shafts, and the like and also for fixing those members themselves in a similar manner and to obtain an elastic grip or thrust on or against any bodies it may be desired to secure thereby.

Locking-nuts constructed according to my invention for use in or connected with screwed bolts or studs for mechanical, constructional, or railway work adapt themselves to fit threads of almost any degree of tightness or looseness and are capable of being locked automatically against any surface or on any position in the length of a bolt or stud. They require considerably less force than is necessary to operate any existing nuts or locking-nuts and are yet capable of being screwed on any thread and up to any surface, (freely by hand only, if so desired.) The locking properties being fractional and possessing the limit of grip do not injure the thread and are sufficiently reliable to be unaffected by vibrations or atmospherical variations or oxidations, and, further, are capable of immediate unlocking and then removal by hand, if so desired, and require neither special knowledge nor tools to operate them other than the usual process of screwing up a nut. They have no indentations or crushed threads, neither are their outer walls split, and are to all appearances the same as ordinary nuts, and as a commercial article in one piece they will retain their efficiency and locking properties for an unlimited time irrespective of the number of times they are screwed on and off. For surface works—uch as fixing fish-plates or cylinder-covers and the like—they possess a powerful elastic effort against the work and are superior to spring-washers.

By the term "shafts" I mean and include any such article adapted to or requiring to be fixed similarly—for instance, hammer-shafts, spokes of wheels, legs of chairs and tables, broom-handles, shafting, (solid or hollow,) the latter including tubes made of metal or soft material, such as rubber and the like. This locking of the various bodies, as above set forth, I effect by the use of a spiral coil of suitable material and of special shape and section, as hereinafter set forth.

In order that my invention may be readily understood, reference is to be had to the following description and accompanying sheets of drawings, in which—

Figure 5:
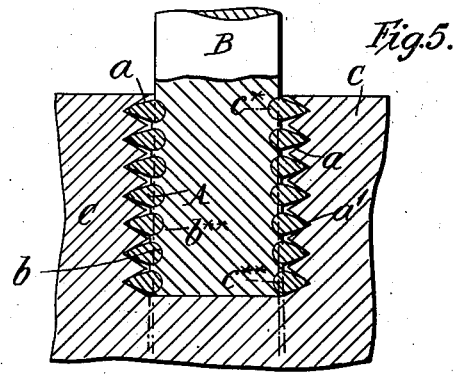
Figure 6:
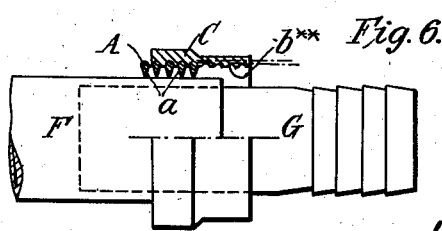
Figure 7:
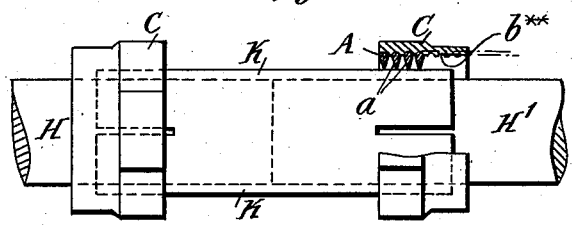
Figure 8:
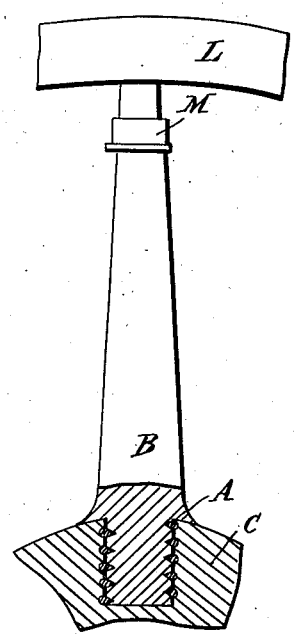
Figure 9:
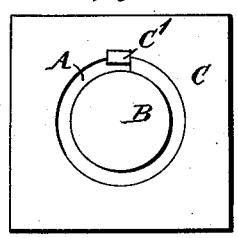

Figure 1 is a view of the spiral coil extended in order to show the inner and outer faces thereof and extending as they do spirally so as to form a worm inside and outside throughout their entire length. Fig. 2 is an enlarged section showing its round and inclined V-faces. Fig. 3 is a sectional view showing the coil in operation and in its idle or normal condition with coils tilted toward inside end of nut. Fig. 4 shows the lock taking the form of a nut applied to a fish-plate in compression with coils tilted toward outside of nut. Fig. 5 shows the lock as applied to a stud, the coil section being reversed—viz., round faces against stud; and Fig. 6 illustrates the application thereof to serve as a union for hose or pipe couplings. Fig. 7 illustrates the application thereof to coupling-shafts (rotatable) together. Fig. 8 shows the spiral coil adapted to serve as a spoke, shaft, or the like holder. Fig. 9 is a detail hereinafter referred to.

Like letters of reference indicate corresponding parts in the several views.

In carrying my invention into practice in one instance I take a nut (either in the blank or already threaded) of the usual form and dimensions as are commonly used in the various branches of engineering and enlarge the hole by boring or any other convenient method, so that the same may just clear the threaded portion of any bolt or stud on which it is intended to use it. I then tap the said hole with a special tap having the same number of threads to the inch as the bolt or stud on which it is intended to be used, said tapping lengthwise being for the most part of a uniform size or bore, the remainder being tapered off, so as to leave a portion of the bore or hole smaller, or, if desired, this tapered portion may remain unthreaded. The thread of the nut I form of a somewhat-different shape to the usual form of the threads on the bolts and studs, inasmuch as it is shallower and rounded at its base, for reasons hereinafter described. I now make a spiral coil A, Fig. 1, of steel or other material and with an ovoidal cross-section, as shown in Fig. 2—viz., rounded outer face $b$ and inclined inner faces $a\ a$, forming a knife or V edge $a'$ with slightly-rounded apex, and the walls being so formed as to be a continuous and tilted worm throughout its entire length to fill in the space between the nut C and the bolt or stud B, Fig. 3, so that when occupying said space between the nut and the bolt or stud its inner $a\ a$ and outer surfaces $b$ will fit into the interstices between the threads of both nut and bolt or stud, save and excepting sufficient play in the V threads to permit of coil tilting, as hereinafter described. This form of coil enables it to be not only screwed onto the bolt or stud B, but also to permit of the nut C being screwed onto it and in its turn. This form of lock possesses elasticity consequent on the tilting of coils, as aforesaid, while in compression, and on its recoil caused by the tilting of coils in the reverse or releasing, and is capable of adapting itself to threads of varying degrees of tightness.

In operation the spiral-wire coil A is screwed into the nut C and extends throughout the uniform-sized portion of thread or bore—viz., from $c$ to $c^\times$, Fig. 3. The nut C and coil as a a whole is now run on the bolt or stud B as an ordinary nut, but on meeting with an obstruction—say, for instance, the face of the fish-plate E, Fig. 4, or a tight or damaged portion of thread of the bolt or stud—the nut proper, C, will commence overrunning the wire coil A, thereby increasing its hold on the thread of the bolt or stud by reason of the coil A being forced into the tapered or smaller bore portion $C^\times$ to $C^{\times\times}$ of the nut. This overrunning of the coil by the nut may be brought about by the mere sympathetic conditions (so to speak) of a locking arrangement of such a construction herein described, because the shallow and rounded threads $b^{\times\times}$ offer less resistance to axial movement than the deep V $b^\times$ on the bolt or stud. Further, the latter variety of thread is affected to a greater extent by the wedging or jamming action consequent on the tilting of the coil A when the nut C is engaged in compression against any surfaces, (see Fig. 4,) the tilting of the coils thus imparting an elastic effort capable of recoil from end to end or lengthwise of the bolt or stud on which it is operating. A small amount of recoil axially is, moreover, obtained on the release of the lock. The release is obtained by a similar overrunning of the nut on the coil in the reverse direction. The lock can be more permanently maintained, if so desired, by preventing the reverse axial movement of the nut on the coil by increasing the length of the coil in a reduced size, so as to extend right through and beyond the tight or taper end of nut C, as at A', Fig. 4, (see dotted lines,) to enable it to be turned up against the back end of the nut. The coil may be advanced toward and into the tight or taper end of the nut previous to placing the nut on the bolt or stud, so that it may be tight on entering the thread of the nut without the necessity of depending on the axial movement after or while being screwed on.

I may in some cases prevent the coil running out of the nut on being unscrewed by indenting, as at C", Fig. 9, the upper or under edge or similarly treating the threads internally or externally for temporary or permanent purposes.

For convenience when running the nut on or removing the same from a bolt, stud, or the like I may use a tool consisting of another nut with a coil of a reduced section inserted therein, said coil projecting sufficiently far to enable it to be run into the tight or taper end of thread of the nut to be locked until it engages with the coil therein, thus temporarily arresting any axial movement of the coil whil screwing the nut to the required position or similarly used to release it. I may in like manner adapt my locking device to the fixing of studs, pipes, or shaft-couplings should they be screwed or one or both of their surfaces be smooth by varying the size, section, or shape or by hardening the coil, and, if desired, I may in some cases use a coil or liner of sheet metal suitably indented by pressing or rolling or by turning the collar or coil from a bar.

When applying my invention to the fixing of studs—say, for instance, in cylinders (see Fig. 5)—I form my spiral coil slightly taper, as shown, with the inclined faces $a\ a$ outward and the rounded face $b$ inward and taper the stud B, which is threaded to correspond to the coil, from $c^\times$ to $c^{\times\times}$—that is to say, smaller at the top than bottom. The body or cylinder C (the nut in the foregoing description) having been drilled and threaded to suit the coil A, the coil is then screwed onto the stud and together screwed into and down to the bottom of hole, and upon any attempt at unscrewing stud the coil remains stationary, naturally so from reasons previously described, (or may be more permanently forced to do by indenting the edge of body, as previously described and shown, C', Fig. 9,) causing the stud to overrun the same and jam itself and the coil by reason of the taper of stud and coil aforementioned, thereby securely holding the stud in position.

In Fig. 6 I have shown in one form how my invention may be applied to pipe-couplings. In said figure, F represents a rubber hose-pipe, and G the union-piece or sleeve. The coil A is screwed into position (its expansive properties easily permitting this) over the hose and the tapered cap (nut) C screwed thereon, forcing the inclined faces *a a* into the hose, causing the same to securely grip the union-piece. Fig. 7 illustrates in another form how my lock may be applied to coupling the shafts (rotatable) H H' or shafts, (hollow,) such as metal piping, together. In this case I interpose between the said shafts and the coil A a split sleeve K, so that when the coil A is compressed by the cap C (nut) the sleeve is caused to close up, tightly gripping the shafts. Although I have shown two such locking devices, yet I may use only one by increasing the length of coil and cap and placing same right over the butt-joint. Further, I may apply my said invention to the holding of shafts and the like. By this I mean such articles as hammer-shafts, spokes of wheels, legs of chairs or tables made of soft materials, such as rubber or wood. Such an application is shown in Fig. 8. In this case a spoke (in the present instance) is held fast by screwing it down inside the coil A, which coil A has been primarily screwed into the boss or hub (nut) C of the wheel and shaped as in Fig. 3, thereby forcing the same into the wood forming the boss of hub (nut C) of the wheel, as aforesaid, and at the same time forming a thread on the spoke end itself, as shown, (when wood is used, tapping or threading by means of screwing-tools being unnecessary.) M represents any well-known adjustable means for connecting the outer spoke end with the felly or rim L of the wheel.

Having now described my invention, what I claim as new, and desire to secure by Letters Patent, is—

1. In a locking device of the class described, the combination with separate threaded elements to be coupled arranged one within the other with their opposing portions out of contact and one of which elements is of a tapering form, of a resilient spirally-coiled locking-body provided with individual coils having a screw engagement with the said separate elements and extending across the interval between the opposing threaded portions, said coils being arranged to be overrun screwwise by one of the elements to provide a frictional lock between the two.

2. In a locking device of the class described, the combination with the separate elements to be coupled arranged in separated relation with their opposing portions out of contact, of a resilient spirally-coiled body provided with individual coils formed with flattened faces and having a screw engagement with the elements to be coupled, said coils being tiltable under compression.

3. In a locking device of the class described, the combination with the separate threaded elements to be coupled arranged in separated relation with their opposing portions out of contact, of a spirally-coiled body extending across the interval between said sections and having individual flattened coils tiltable endwise of the body when under compression to provide a frictional lock between the elements to be coupled.

4. In a locking device of the class described, the combination with the separate threaded elements to be coupled arranged in separated relation with their opposing portions out of contact, of a resilient spirally-coiled body extending across the interval between said elements and having its individual coils formed with wide rounded portions at one edge and pointed portions at the opposite edge, said individual coils also having flattened faces converging to the pointed edges and having a frictional locking engagement with the threads of one of said elements.

5. In a threaded connection, the combination with the separate elements to be coupled arranged in separated relation with the threaded portions out of contact, of a locking device comprising a coiled body extending across the interval between said two elements and having individual coils formed with flattened convergent faces, the individual coils of the locking device being tiltable under endwise compression.

6. In a locking device of the class described, the combination with two threaded bodies to be coupled arranged one within the other and one of which is of a tapered form, one of said bodies being provided with deep threads and the other of said bodies having an opposing portion with shallow threads, of a resilient spirally-coiled locking-body having its coils formed with pointed portions to engage the deep threads of one body and with rounded surfaces to engage the shallow threads of the other body, said matching rounded surfaces and shallow threads permitting one body to be forced over or overrun screwwise by the second body, thereby bringing the coiled body into frictional locking engagement with both of the bodies to be connected.

In testimony whereof I have affixed my signature in presence of two witnesses.

DALE MARSHALL.

Witnesses:
 EDWIN SEACOME,
 A. D. JENKINS.